(12) United States Patent
Bharghavan et al.

(10) Patent No.: US 10,380,570 B2
(45) Date of Patent: Aug. 13, 2019

(54) SYSTEM AND METHOD FOR SECURE COMMUNICATION FOR CASHLESS TRANSACTIONS

(75) Inventors: Vaduvur Bharghavan, Morgan Hill, CA (US); Jari Malinen, Santa Clara, CA (US); Rajinder Singh, Milpitas, CA (US); Jason Fieldman, Los Angeles, CA (US); Rachna Ahlawat, San Jose, CA (US); Kannan Konath, San Ramon, CA (US); Sandeep Gilotra, Fremont, CA (US)

(73) Assignee: Ondot System, Inc., San Jose, CA (US)

( * ) Notice: Subject to any disclaimer, the term of this patent is extended or adjusted under 35 U.S.C. 154(b) by 319 days.

(21) Appl. No.: 13/099,240

(22) Filed: May 2, 2011

(65) Prior Publication Data

US 2012/0284193 A1    Nov. 8, 2012

(51) Int. Cl.
*G06Q 20/00* (2012.01)
*G06Q 20/20* (2012.01)
*H04L 9/32* (2006.01)

(52) U.S. Cl.
CPC ......... *G06Q 20/202* (2013.01); *H04L 9/3263* (2013.01); *H04L 9/3271* (2013.01); *H04L 2209/56* (2013.01)

(58) Field of Classification Search
CPC .................................................. G06Q 20/3229
USPC ............................... 705/64; 710/36; 713/168
See application file for complete search history.

(56) References Cited

U.S. PATENT DOCUMENTS

| | | |
|---|---|---|
| 5,708,422 A | 1/1998 | Blonder |
| 5,884,289 A | 3/1999 | Anderson |
| 5,953,710 A | 9/1999 | Fleming |
| 6,029,154 A | 2/2000 | Pettitt |
| 6,122,624 A | 9/2000 | Tetro |
| 6,343,279 B1 | 1/2002 | Bissonette |
| 6,422,462 B1 | 7/2002 | Cohen |
| 6,516,056 B1 | 2/2003 | Justice et al. |
| 7,427,033 B1 | 9/2008 | Roskind |
| 7,784,684 B2 | 8/2010 | Labrou et al. |
| 7,793,851 B2 | 9/2010 | Mullen |
| 7,798,416 B2 | 9/2010 | Roskind |
| 7,801,826 B2 | 9/2010 | Labrou et al. |
| 7,813,725 B2 | 10/2010 | Celik |
| 7,822,688 B2 | 10/2010 | Labrou et al. |
| 7,828,220 B2 | 11/2010 | Mullen |

(Continued)

OTHER PUBLICATIONS

"Sniffing Tutorial part 1—intercepting Network Traffic", NETRESEC Network Security Biog. Web. , Mar. 11, 2011. http://www.netresec.com/?page=Blog&month=2011-03&post=Sniffing-Tutorial-part-1—Intercepting-Network-Traffic.

*Primary Examiner* — Chinedu C Agwumezie
(74) *Attorney, Agent, or Firm* — Law Office of Dorian Cartwright; Dorian Cartwright (57) ABSTRACT

Embodiments of the present invention provide a system and method for an access point providing client to point-of-sale communication over a network, comprising: receiving credentials from the point-of-sale; sending at least one beacon message; receiving a probe request from a client; sending a probe response to the client; authenticating a connection with the client; exchanging capabilities with the client; performing a security handshake with the client; assigning at least one dynamic IP address to the client; and establishing an https session between the client and the point-of-sale over the network.

3 Claims, 3 Drawing Sheets

(56) References Cited

U.S. PATENT DOCUMENTS

| | | |
|---|---|---|
| 8,127,982 B1 | 3/2012 | Casey |
| 8,706,620 B2 | 4/2014 | Ciurea |
| 9,324,105 B2* | 4/2016 | Kopikare ............. H04W 8/005 |
| 2002/0035539 A1 | 3/2002 | O'Connell |
| 2002/0082995 A1 | 6/2002 | Christie, IV |
| 2002/0111886 A1 | 8/2002 | Chenevich et al. |
| 2002/0123938 A1 | 9/2002 | Yu |
| 2002/0152123 A1 | 10/2002 | Giordano et al. |
| 2002/0194141 A1* | 12/2002 | Langensteiner ....... G06Q 20/02 705/67 |
| 2002/0198806 A1 | 12/2002 | Blagg |
| 2003/0028481 A1 | 2/2003 | Flitcroft |
| 2004/0039694 A1 | 2/2004 | Dunn |
| 2004/0068653 A1* | 4/2004 | Fascenda ............. H04L 9/0844 713/168 |
| 2004/0128243 A1 | 7/2004 | Kavanagh |
| 2005/0097019 A1 | 5/2005 | Jacobs |
| 2005/0102243 A1 | 5/2005 | Kinsella |
| 2005/0240527 A1 | 10/2005 | Goldman |
| 2005/0268003 A1* | 12/2005 | Wang ................. H04L 61/2015 710/36 |
| 2006/0085337 A1 | 4/2006 | Conforti et al. |
| 2006/0178986 A1 | 8/2006 | Giordano et al. |
| 2007/0039049 A1 | 2/2007 | Kupferman et al. |
| 2007/0124256 A1 | 5/2007 | Crooks et al. |
| 2007/0157027 A1* | 7/2007 | Palekar ............. H04L 63/0428 713/171 |
| 2008/0101283 A1* | 5/2008 | Calhoun et al. ............. 370/328 |
| 2008/0120235 A1 | 5/2008 | Chu |
| 2008/0147523 A1 | 6/2008 | Mulry et al. |
| 2008/0228648 A1 | 9/2008 | Kemper |
| 2008/0257952 A1 | 10/2008 | Zandonadi |
| 2008/0263402 A1 | 10/2008 | Braysy |
| 2009/0112651 A1 | 4/2009 | Atkinson |
| 2009/0132424 A1 | 5/2009 | Kendrick et al. |
| 2009/0138968 A1 | 5/2009 | Serber |
| 2009/0164327 A1 | 6/2009 | Bishop et al. |
| 2009/0164330 A1 | 6/2009 | Bishop et al. |
| 2009/0254462 A1 | 10/2009 | Tomchek et al. |
| 2009/0313147 A1 | 12/2009 | Balasubramanian |
| 2010/0051684 A1 | 3/2010 | Powers |
| 2010/0063903 A1 | 3/2010 | Whipple et al. |
| 2010/0106611 A1 | 4/2010 | Paulsen |
| 2010/0114776 A1 | 5/2010 | Weller et al. |
| 2010/0153224 A1 | 6/2010 | Livnat |
| 2010/0274720 A1 | 10/2010 | Carlson |
| 2010/0325047 A1 | 12/2010 | Carlson et al. |
| 2011/0238564 A1 | 9/2011 | Lim et al. |
| 2011/0251892 A1* | 10/2011 | Laracey ............. G06Q 30/0253 705/14.51 |
| 2012/0030109 A1 | 2/2012 | Dooley Maley |
| 2012/0036013 A1 | 2/2012 | Neuhaus |
| 2012/0059758 A1 | 3/2012 | Carlson |
| 2012/0072347 A1 | 3/2012 | Conway |
| 2012/0095918 A1 | 4/2012 | Jurss |
| 2012/0143730 A1* | 6/2012 | Ansari et al. ................. 705/27.1 |
| 2012/0197708 A1 | 8/2012 | Mullen et al. |
| 2012/0197802 A1 | 8/2012 | Smith |
| 2012/0225639 A1 | 9/2012 | Gazdzinski |
| 2012/0271697 A1 | 10/2012 | Gilman |
| 2012/0303525 A1 | 11/2012 | Sahadevan |
| 2013/0138516 A1 | 5/2013 | White |
| 2013/0282593 A1 | 10/2013 | Merz et al. |
| 2013/0290121 A1 | 10/2013 | Simakov et al. |
| 2013/0332361 A1 | 12/2013 | Ciurea |
| 2013/0332362 A1 | 12/2013 | Ciurea |
| 2013/0346294 A1 | 12/2013 | Faith |
| 2014/0040135 A1 | 2/2014 | Ovick et al. |
| 2014/0095947 A1 | 4/2014 | Mozak |
| 2014/0258119 A1 | 9/2014 | Canis |
| 2014/0304055 A1 | 10/2014 | Faith |
| 2014/0358769 A1 | 12/2014 | Howe et al. |
| 2015/0242949 A1 | 8/2015 | Phillips, IV |

\* cited by examiner

SYSTEM AND METHOD FOR SECURE COMMUNICATION FOR CASHLESS TRANSACTIONS

TECHNICAL FIELD

The present invention relates generally to cashless payment systems, and more particularly, some embodiments relate to systems and methods for secure communication for cashless transactions.

DESCRIPTION OF H RELATED ART

Existing cashless payment systems include credit, debit, and mobile payments. These transactions typically occur between an end user and a merchant, and involve validation and mediation through trusted third parties. An end user device (e.g., credit/debit card, mobile phone, software application on a computer or phone) contains information to validate the identity and the credit or debit card information of the end user. To initiate a cashless transaction, the merchant presents the transaction amount to the end user and requests a form of payment. Some cashless payment systems involve purchasing goods and services using a mobile phone and methods of initializing mobile payment software at a secure transaction server (STS). Such systems may be used to perform a mobile phone cashless monetary transaction over the mobile phone network according to one or more protocols.

BRIEF SUMMARY OF EMBODIMENTS OF THE INVENTION

Embodiments of the present invention provide methods for an access point providing client to point-of-sale communication over a network, comprising: receiving credentials from the point-of-sale; sending at least one beacon message; receiving a probe request from a client; sending a probe response to the client; authenticating a connection with the client; exchanging capabilities with the client; performing a security handshake with the client; assigning at least one dynamic IP address to the client; and establishing an https session between the client and the point-of-sale over the network.

Further embodiments of the present invention provide systems for an access point providing client to point-of-sale communication over a network, comprising: a processor; and at least one computer program residing on the processor; wherein the computer program is stored on a non-transitory computer readable medium having computer executable program code embodied thereon, the computer executable program code configured to cause the server to: receive credentials from the point-of-sale; send at least one beacon message; receive a probe request from a client; send a probe response to the client; authenticate a connection with the client; exchange capabilities with the client; perform a security handshake with the client; assign at least one dynamic IP address to the client; and establish an https session between the client and the point-of-sale over the network.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Embodiments of the present invention are directed toward systems and methods for secure communication between an end user device and a point-of-sale device to execute secure cashless transactions. These new methods of communication enable merchants to convert all card-based point-of-sale transactions into online transactions, thus eliminating the need for plastic credit cards and debit cards.

The Cashless Transaction Process

As stated, examples of cashless transactions include credit, debit, and mobile payments that occur between an end user and a merchant, and involve validation and mediation through trusted third parties. An end user device (e.g., credit/debit card, mobile phone, software application on a computer or phone) contains information to validate the identity and the credit or debit card information of the end user. To initiate a cashless transaction, the merchant presents the transaction amount to the end user and requests a form of payment. The example below entails a common type of credit card transaction process. However, as would be appreciated by those of skill in the art, the present invention is more broadly applicable to other forms of cashless transactions.

In the example, the end user presents his or her identity and form of payment to a merchant's point-of-sale device, such as a card reader or a computer with a networking interface. The communication between the end user device and the point-of-sale may involve: (i) physical contact such as a card swipe through a card reader, (ii) physical or logical point-to-point link such as a wireless communication link over Wi-Fi or Near Field Communications (NFC) or Radio Frequency (e.g., REID), or a logical indirect connection over a computer network. The exchange between the point-ofsale device and the end user device may include additional verification information from the end user, such as a Card Verification Value (CVV).

The point-of-sale device then initiates a communication with its trusted third party system such as a processor or acquiring bank or other transaction processing entity. The trusted third party system in turn establishes a connection with the merchant acquiring bank and presents the transaction and the user's credentials. The acquiring bank initiates an authorization with the issuing bank of the end user (as identified via the credit card number), which accepts or rejects the authorization request. This information is relayed back through the trusted third party to the merchant point-of-sale and the end user. At the end of this transaction, a unique transaction identifier is recorded by all parties involved. Additionally, the merchant typically receives confirmation from the end user, for example, by a signature on a receipt confirming his or her obligation to pay the transaction amount to the merchant.

The actual transfer of funds may be initiated concurrently with the transaction or at a later point in time in a separate settlement phase. The trusted third party system may involve a single entity such as the acquiring bank, or a chain of trusted entities including a processor, credit card network, acquiring bank, and issuing bank.

Embodiments of the invention disclosed herein provide an automatic and secure mechanism for the end user device to establish a logical point-to-point communication link with the merchant point-of-sale device. For it illustration purposes, but not restricted to the embodiments used for the illustration, the invention is described in the context of an end user mobile phone with a wireless interface following the IEEE 802.11 standard communicating with a point-of-sale device that is connected to a wireless network following the IEEE 802.11 standard. The mobile phone, hereinafter referred to as the "client," has an application installed in the device, hereinafter referred to as the "client application," which has the identity of the end user as well as the credit or debit card information.

IEEE 802.11 Link Layer Connection

The IEEE 802.11 standards committee defines a set of Radio Frequency (RF), baseband, and medium access protocol standards that govern the operation of "Wi-Fi" devices. Wi-Fi operates in the unlicensed 2.4 GHz and 5 GHz band using direct-sequence spread spectrum over a 20 MHz or 40 MHz channel. Wi-Fi service is typically set up via "access point" comprising wired-to-wireless bridges or routers.

Figure 1:
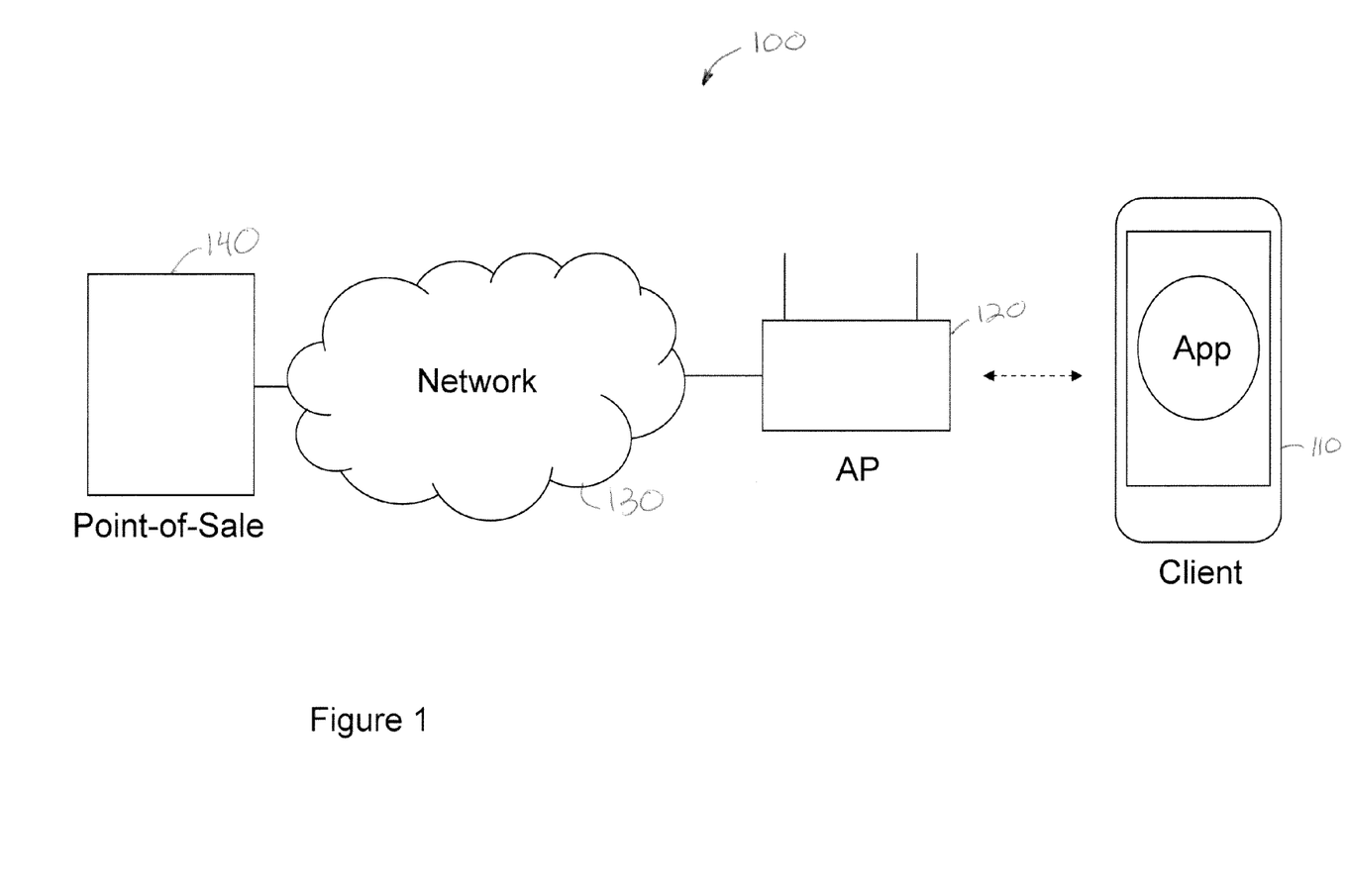
FIG. 1 is a diagram depicting a system for client to point-of-sale communication, in accordance with an embodiment of the invention.

FIG. 1 is a diagram depicting a system 100 for client to point-of-sale communication. In the illustrated embodiment, client 110 (e.g., a mobile device) is in wireless communication with an access point (AP) 120, which has a wired Ethernet connection to an extended computer network 130 such as the Internet. The network 130 has a wired or wireless connection to point-of-sale 140, and one or more wireless interfaces (i.e., access points 120) that allow it to provide service to Wi-Fi client devices 110.

Figure 2:
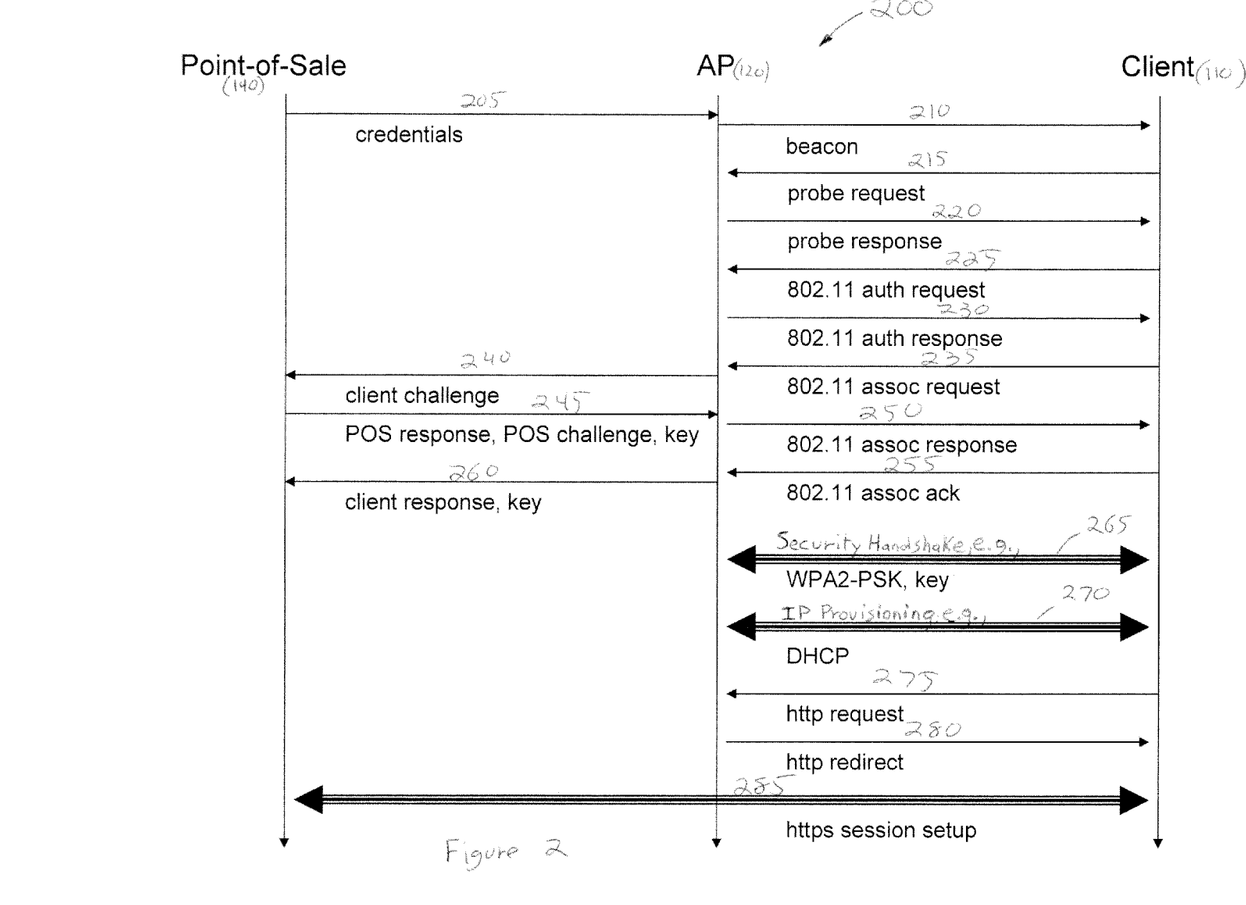
FIG. 2 is a diagram illustrating a method for client to point-of-sale communication, in accordance with an embodiment of the invention.

FIG. 2 is a diagram depicting a method 200 for client to point-of-sale communication among the client 110, access point 120 and point-of-sale 140. In particular, operation 205 involves the point-of-sale sending credentials to the access point 120, which advertises one or more wireless services, called Service Set Identifiers or "SSIDs," by sending periodic "beacon" messages, typically every 100 ms. Operation 210 entails access point 120 sending a beacon. By way of example, each beacon may contain: (i) a wireless medium access control (MAC) address, (ii) the Based Service Set Identifier or "BSSID," which uniquely identifies an SSID served by an access point, (iii) the SSID, (iv) wireless properties of the service, and (v) optional extensible fields called Information Elements. These extensible fields identify additional capabilities or properties, some of which may be standard (such as extended security modes, e.g., Wi-Fi Protected Access WPA or WPA2), and some of which may be vendor-specific extensions.

A logical link-layer point-to-point 802.11 wireless communication link for a client 110 can be set up between a client 110 and an access point 120. A wireless client proactively scans the available spectrum to search for access points in its proximity that match the wireless service properties for which it is configured. Such properties may include RF band, link-layer security method, and any vendor-specific attributes that the client driver or application may be configured to match.

With continued reference to FIG. 2, when the client 110 sees one or more candidate BSSIDs to which it can connect, it initiates the connection process by sending a probe request (operation 215). All access points 120 that are available for service respond to the request with individual probe responses (operation 220), each containing the properties (including the extension information elements). The client 110 then selects an access point 120 and initiates the 802.11 layer connection exchange. This connection exchange has two phases, namely: (i) an 802.11 authentication phase, which is typically a two-way request-response handshake protocol (operations 225, 230), followed by (ii) an 802.11 association phase, which is a two-way request-response handshake protocol (operations 250, 255). During the 802.11 association request-response handshake, the client and the access point exchange capabilities (operations 240, 245), thereby defining the Wi-Fi parameters used to establish the logical point-to-point connection, often called an "association."

Once the client 110 is associated with an access point 120 (depending on its security configuration), operation 265 entails a security handshake between the client 110 and the access point 120. For example, the client 110 may initiate a layer 2 authentication and encryption protocol (e.g., WPA2) to establish secure unicast and broadcast session keys. All subsequent communication with the client 110 is encrypted. Operation 270 involves IP provisioning, e.g., using Dynamic Host Configuration Protocol (DHCP) to assign dynamic IP addresses to client 110 on the network 130. With dynamic addressing, a client device can have a different IP address every time it connects to the network. The client 110 is now ready to acquire an IP address and start communicating with the network.

With further reference to FIG. 2, operations 275, 280 comprise the client accessing a URL and the access point 120 redirecting the client accordingly. Finally, operation 285 involves the https session setup between the client 110 and the point-of-sale 140 over the network 130. Further details regarding the client to point-of-sale communication is provided below.

The IEEE 802.11 protocol makes several assumptions about how the link layer connectivity is set up between the client 110 and the access point 120. First, it assumes that a client 110 is either pre-configured with, or explicitly makes the choice of, the wireless service (SSID) to which it connects. Second, it assumes that the client 110 and the access point 120 are configured with the same type of security profiles and authentication mechanisms. The specific supported mechanisms for authentication and encryption on an access point 120 for a wireless service are not explicitly contained in the information elements advertised in the beacons or n any of the 802.11-level exchanges. For example, though the beacon and association messages identify WPA2 as a supported security mechanism, they do not explicitly identify the specific type of Extended Authentication Protocol (EAP) that is used for the authentication. Third, it decouples 802.11-level association from link layer authentication and encryption. It is possible for a client 110 to successfully establish 802.11-layer connectivity and repeatedly fail link layer authentication without getting disassociated at the 802.11 layer. This is a loop-hole in the protocol that enables rogue devices to hijack connectivity of clients such that secure systems must rely on higher layer recovery and mitigation schemes to address 802.11-layer connection hijacking.

The implications of the above assumptions on Wi-Fi as a communication medium for use in cashless transactions at a merchant point-of-sale 140 leads to the following objectives. First, end users may not be aware of the SSID advertised by the merchant—selection of the SSID by a manual process must be avoided. Second, as a part of the wireless service, the access point 120 connected to a point-of-sale device must advertise its identity and capabilities, validated by a trusted network 130, so that the client 110 can determine whether it should select the access point 120 or not before initiating 802.11 association. Third, as a part of the association, the client 110 and access point 120 must mutually authenticate each other so that hijacking by rogue access points, as well as fraudulent presentation of stolen credit card numbers, are prevented. These objectives are achieved by employing the methods of automatic establishment of the 802.11 connection described hereinbelow.

4C—Establishment of Secure 802.11 Connectivity Between End User and Point-of-Sale In one embodiment of the invention, a method for automatically establishing a secure 802.11 connection between and end user device and a point-of sale uses the public key infrastructure (PKI) and certificates signed by trusted third parties to mutually authenticate the point-of-sale 140 and the client 110 during the 802.11 association process. In a second embodiment, an alternative method utilizes the PKI infrastructure and signed certificates to mutually authenticate the point-of-sale 140 and the client 110 immediately after the 802.11 association process, but before any transaction occurs between the client 110 and the point-of-sale 140.

For each transaction type (e.g., credit, debit, mobile payment, etc.) and network 130 (e.g., Visa, MasterCard, Cirrus, Star, etc.) supported by the merchant, the merchant point-of-sale 140 has a public key certificate signed by the network 130, and a corresponding private key stored securely in the device. For each credit or debit card the client 110 has a public key certificate signed by the network 130 and a corresponding private key stored securely in the device.

PKI-Based Mutual Authentication as Part of the 802.11 Association

The 802.11 access point 120 associated with a point-of-sale device advertises the capability to support the 4C authentication method in one or more information elements in the beacon of the SSID. Each information element contains the type of transaction (e.g., credit, debit, mobile payment, etc.), the network 130 (Visa, MasterCard, Cirrus, Star, etc.), and the merchant name/address/identity, signed by the appropriate certifying authority (which could be a trusted authority such as Verisign or the network). The client application has the supported networks in its trusted chain.

When a user desires to make a payment, the application scans for all the BSSIDs in the vicinity that support the 4C payment method corresponding to one of the networks in its trusted chain. It then presents the user with a list of payment choices. Each element in the list contains the merchant identity, transaction type (credit or debit), and the network 130. When the user makes a selection from the list, the client 110 initiates an 802.11 authentication and association to the BSSID. The 802.11 authentication handshake is unmodified, while the association handshake is modified and includes a pair of challenge-response handshakes, as set forth below.

Specifically, the client sends an 802.11 association request with an additional 4C message (i.e., handshake message 1 or HS-MSG1) containing the following information: (i) the payment method and network 130, (ii) the client's public key certificate signed by the trusted authority, and (iii) a unique value nonce-1 that is encrypted in the public key of the merchant. This public key is validated by the certificate from a trusted authority that is contained in the beacon. The access point 120 forwards the client's HS-MSG1 message to the point-of-sale 140.

Upon receiving the HS-MSG1 message, the point-of-sale 140: (i) validates that it can support the payment and network 130, (ii) decrypts nonce-1 with its corresponding private key, (iii) increments the nonce-1 by a random number nonce-2, and (iv) creates a challenge response nonce-1+nonce-2, and nonce-2 encrypted in its private key. In addition, the point-of-sale 140 initiates its own challenge to the client 110 by generating a unique value nonce-3, signed by the public key of the client 110. This public key is validated by the certificate from a trusted authority that is presented by the client 110. It also generates a unique secure session key K that is encrypted in its private key and then the client's public key. All these three elements comprise the response message HS-MSG2 from the point-of-sale 140 to the client 110. The point-of-sale 140 forwards a message (i.e., HS-MSG2) to the access point 120. The access point 120 incorporates the HS-MSG2 message in its association response to the client 110.

To validate the point-of-sale 140, the client 110: (i) decrypts the challenge response and the unique session key K (by decrypting with its private key and then the public key of the point-of-sale 140), (ii) creates a 4C-m3 challenge response message ({nonce-3+nonce-4, nonce-4} encrypted by its private key) that is encrypted in the session key K, and (iii) sends this message in a new 802.11 association-ACK message. The access point 120 forwards the client's HS-MSG3 message to the point-of-sale 140. Once the point-of-sale 140 validates the client 110, it forwards the session key K and an "association-ok" message to the access point 120 using a secure connection link between the point-of-sale 140 and the access point 120. At this stage, the secure session is established between the client 110 and the access point 120.

Thereafter, if the challenge/response fails or is incomplete on either side, the challenging party immediately disassociates the peer. If the challenge/response succeeds, the client 110 and the access point 120 use the session key K as the passphrase for establishing a WPA2-PSK secure session.

Once the client 110 and access point 120 establish a secure L2 connection, the client 110 acquires an IP address and invokes a web browser, which is redirected to the point-of-sale server over a secure https session using a captive portal capability that automatically redirects all web communications to the point-of-sale server. The point-of-sale server does not need to be physically within the merchant premises; it only needs to have network connectivity to the client device. The client 110 and point-of-sale 140 mutually authenticate each other using the PKI infrastructure with embedded scripts for certificate-based mutual authentication and encryption, transparent to the end user, following mechanisms similar to the one described above. After mutual authentication and establishment of a secure connection, the client 110 is ready to initiate the credit card transaction over the secure https end-to-end connection between the client browser and the point-of-sale web server.

PKI Based Mutual Authentication a 802.11 Association

A client application is configured with, or informed out-of-band of, the SSID to which it must associate. One mechanism by which the client application gets the SSID configuration is by having the merchant advertise the SSID in a bar code or si means, which is read by the client device and automatically imported into the application configuration. This approach eliminates the need for an end user to manually configure the settings or the application to have preconfigured knowledge of the settings. A second mechanism is for the merchant to advertise the SSID and for the end user to select the SSID using the native Wi-Fi connectivity application on the client device.

The client 110 scans the network 130 to detect the presence of access points that serve the preferred SSID. The client 110 sends out broadcast and directed probes, to which the access points respond with probe responses. The client 110 selects an access point 120 to which it seeks to associate, and initiates the 802.11 authentication and 802.11 association messages. At this stage, the client 110 and access point 120 are ready to communicate over an open, unencrypted connection.

Subsequently, the client 110 acquires an IP address and invokes a web browser, which is redirected to the point-of-sale server over a secure https session using a captive portal capability that automatically redirects all web communications to the point-of-sale server. The point-of-sale server does not need to be physically within the merchant premises; it only needs to have network connectivity to the client device. The client 110 and point-of-sale mutually authenticate each other using the PKI infrastructure with embedded scripts for certificate-based mutual authentication and encryption, transparent to the end user, following mechanisms similar to the one described above. After mutual authentication and establishment of a secure connection, the client 110 is ready to initiate the credit card transaction over the secure https end-to-end connection between the client browser and the point-of-sale web server.

This method essentially uses a secure https session on top of an open 802.11 connection in order to mutually authenticate the point-of-sale 140 and client 110. In this case, the client associated to a known SSID, and the authentication and encryption were performed at the https layer rather than the 802.11 layer.

According to embodiments of the invention, all point-of-sale transactions can be converted into secure online transactions. The need for legacy plastic card swipe systems is eliminated by using credit card applications on smart phones as "software credit cards" that interact with point-of-sale devices over a computer network 130.

Figure 3:
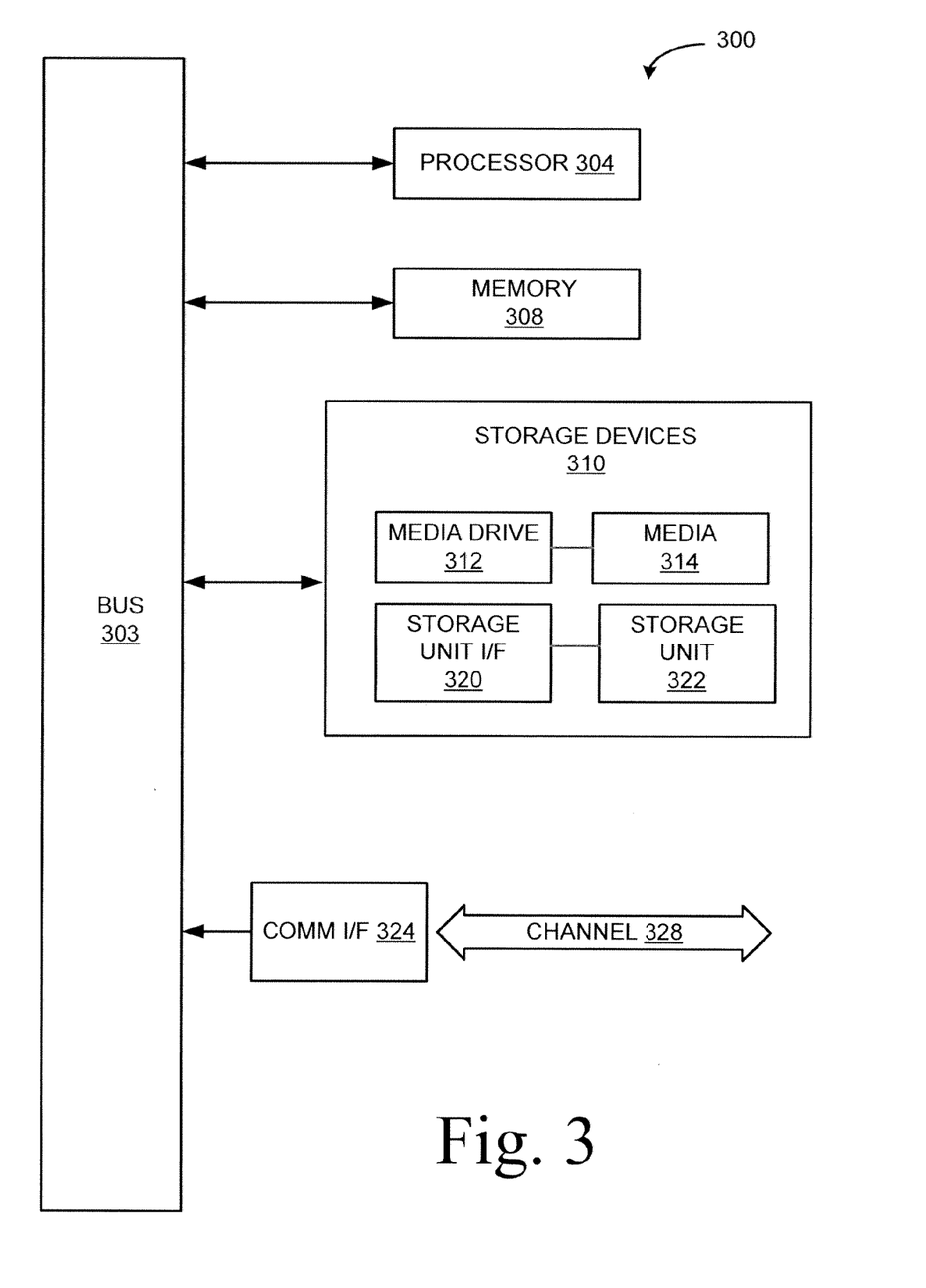
FIG. 3 is a diagram illustrating an example computing module for implementing various embodiments of the invention.

As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or ore separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 3. Various embodiments are described in terms of this example-computing module 300. After reading this description, it will become apparent to a person skilled in the relevant art how to implement the invention using other computing modules or architectures.

Referring now to FIG. 3, computing module 300 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the illustrated example, processor 304 is connected to a bus 303, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 303 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a floppy disk drive, a magnetic tape drive, an optical disk drive, a CD, DVD or Blu-ray drive (R or RW), or other removable or fixed media drive might be provided. Accordingly, storage media 314 might include, for example, a hard disk, a floppy disk, magnetic tape, cartridge, optical disk, a CD, DVD or Blu-ray, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method in an access point facilitating client to point-of sale communication over a data network secured with mutual authentication during client association, the method comprising:

receiving, by the access point, authentication credentials from a point-of-sale device;

periodically broadcasting, by the access point, at least one beacon message to advertise payment services of the point-of-sale device, wherein the at least one beacon message comprises information elements including transaction type, a payment network, and merchant information;

receiving, by the access point, a probe request from a client based on the payment services advertised in the at least one beacon message;

sending, by the access point, a probe response to the client responsive to the probe request;

performing, by the access point, an authentication operation to authenticate a connection with the client;

performing, by the access point, an association operation with mutual authentication to create an association with the client, wherein the association operation comprises:

receiving a client challenge from the client with an association request, and sending the client challenge to the point-of-sale device on behalf of the client, receiving a response from the point-of-sale device to the client challenge with a point-of-sale challenge, and sending the client challenge response and the point-of-sale challenge to the client with an association response on behalf of the point-of-sale device, and receiving an acknowledgment from the client of the association response with a response to the point-of-sale challenge, and sending the point-of-sale challenge response to the point-of-sale device on behalf of the client;

assigning, by the access point, at least one dynamic IP address to the client; and establishing, by the access point, an https session between the client and the point-of-sale device over the data network.

2. The method of claim 1, wherein the receiving the probe request from the client is responsive to a BSSID (basic service set identifier) of the access point being selected as a preferred payment method, wherein the client selects the BSSID of the access point from a plurality of BSSIDs that are each associated with at least one payment method in response to receiving a selection at the client of preferred payment method.

3. The method of claim 2, wherein the selection at the client of the preferred payment method is received without exposing the plurality of BSSIDs corresponding to payment methods.

\* \* \* \* \*